Feb. 24, 1970 H. JONES 3,497,241
TRAILER SWAY CONTROL DEVICE
Filed March 1, 1968
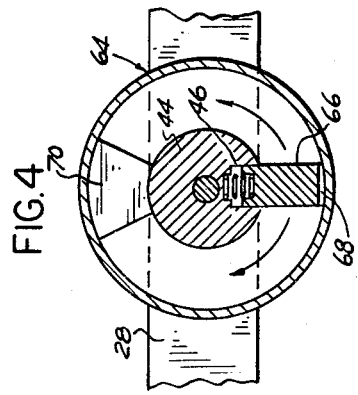
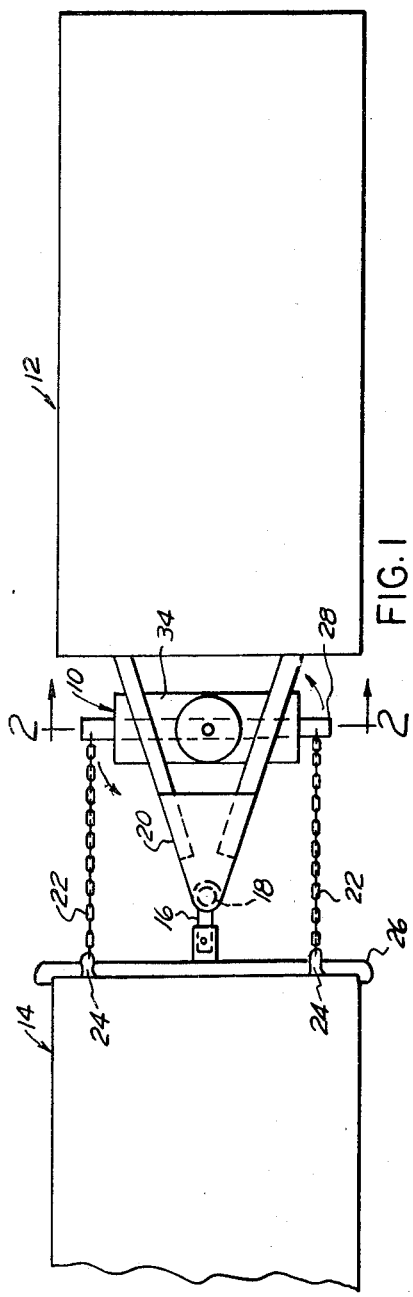
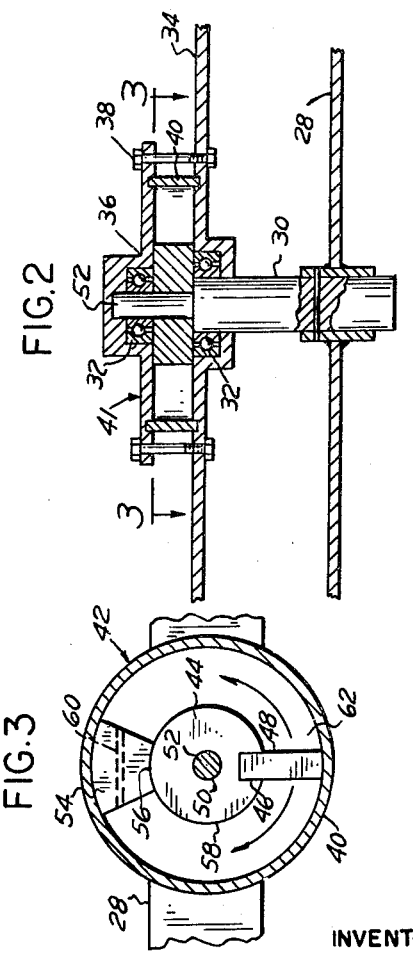
INVENTOR
HICKS JONES
BY Barthel & Bugbee
ATTORNEYS

United States Patent Office 3,497,241
Patented Feb. 24, 1970

3,497,241
TRAILER SWAY CONTROL DEVICE
Hicks Jones, Warren, Mich.
(Box 111, Lewiston, Mich. 49756)
Filed Mar. 1, 1968, Ser. No. 709,553
Int. Cl. B60d *1/00, 7/00*
U.S. Cl. 280—446                              3 Claims

ABSTRACT OF THE DISCLOSURE

A swinging bar pivoted at its midportion to the towing structure on the trailer is connected by flexible connectors, such as chains, to the rearward end of the towing vehicle, which is coupled to the trailer by a pivotal coupling. The swinging bar is drivingly connected to a vertical shaft which carries a vane on a hub or rotor block which is rotatable within a generally cylindrical casing filled with hydraulic fluid, such as oil. A partition block is interposed between the cylindrical casing and the rotor block and has a restricted fluid passageway therethrough. Sway of the trailer is transmitted through the casing to the oil therein whereupon relative rotataion between the vane and the casing forces oil through the restricted passageway with a sway-retarding action. In the FIGURE 4 modification, the restricted passageway is in the spring-pressed vane rather than in the partition block.

---

In the drawings,
FIGURE 1 is a top plan view of a towing vehicle and a trailer equipped with one form of the trailer sway control device of the present invention;
FIGURE 2 is an enlarged fragmentary vertical section taken along the line 2—2 in FIGURE 1;
FIGURE 3 is a horizontal section taken along the line 3—3 in FIGURE 2; and
FIGURE 4 is a view similar to FIGURE 3, but showing a modification thereof.

Referring to the drawing in detail, FIGURE 1 shows a trailer sway control device 10, according to one form of the present invention, for controlling and reducing the sway of a trailer 12 while being towed by an automobile or other towing vehicle 14. The trailer 12 and automobile 14 are coupled in the conventional manner as by a ball post 16 bolted to the automobile 14 engaging a ball socket 18 on the under side of the forward end of a triangular towing structure 20, these constructions being conventional, of general utility, and beyond the scope of the present invention. Chains 22 connected at their forward ends at 24 to the automobile bumper 26 are safety devices conventionally applied to trailers but in a different manner from that now to be described.

The rearward ends of the chains 22 are connected to the outer ends of a restrainedly yieldably swinging bar 28 which at its center is connected to a pivot shaft 30 (FIGURE 2) rotatably supported in anti-friction bearings 32 in a cross plate or attachment member 34 and cover disc 36 respectively. The cover disc 36 is bolted to the cross plate 34 and this in turn is welded or otherwise secured to the towing structure 20. These bolts 38 also hold down the cylindrical side wall 40 against the cross plate 34 to form the casing 41 of a hydraulic sway damping device 42 (FIGURE 3).

This device consists of a central cylindrical rotor block 44 slotted radially at 46 (FIGURE 3) to receive a vane 48 and drilled centrally at 50 to receive the reduced diameter upper portion 52 of the shaft 30, to which it is keyed or splined. Snugly engaging the periphery of the rotor block 44 is a sector-shaped partition block 54 having an arcuate inner end 56 mating with the peripheral surface 58 of the block 44. A restricted fluid passageway 60 extends through the partition block 54 from side to side thereof. The space between the rotor block 44 and the cylindrical side wall 40 forms an oil chamber 62.

The modification 64 shown in FIGURE 4 is similar in principle to that shown in FIGURES 1 to 3 except that a spring-pressed radially-slidable vane 66 is mounted in the radial slot 46 of the rotor block 44 in place of the fixed vane 48. A restricted passageway 68 is provided in the vane 66 and serves the same purpose as the passageway 60 in the partition block 54 of FIGURE 3. A partition block 70 similar to the partition block 54 of FIGURE 3 but lacking the restricted passageway 60 is provided.

In operation, the swaying of the trailer 12 relatively to the towing vehicle 14 during travel is transmitted through the cross plate 34 to the casing 41 and thence to the partition block 54. As the latter swings in an arcuate path relatively to the vane 48, the liquid in the chamber 62 is compressed on one side thereof so as to force it through the restricted passageway 60 with a damping action upon the sway.

In the operation of the modification 64 shown in FIGURE 4, the hydraulic fluid is forced through the restricted passageway 68 in the end of the vane 66 rather than through a passageway in the partition block 70, as in the case of the partition block 54 of FIGURE 3.

I claim:
1. A sway control device adapted to be attached to the towing structure of a trailer having a pivotal coupling with its towing vehicle, said device comprising
   an attachment member adapted to be secured transversely to the towing structure of the trailer,
   a casing with a substantially cylindrical side wall mounted on substantially the mid-portion of said attachment member and containing a hydraulic fluid,
   a rotor element rotatably mounted in said casing and having a portion projecting laterally therefrom substatially into engagement with said side wall,
   a partition element connected to said casing and extending substantially into engagement with said rotor element, a shaft rotatably mounted in said casing and drivingly connected to said rotor element,
   an elongated cross member drivingly connected substantially at its mid-point to said shaft,
   a pair of connectors secured at their rearward ends to said cross member in laterally-spaced relationship to one another remote from said shaft and adapted to be secured at their forward ends to the towing vehicle also in laterally-spaced relationship to one another,
   and means associated with one of said elements for restricting the flow of hydraulic fluid therepast.
2. A sway control device, according to claim 1, wherein said connectors are flexible chains.
3. A sway control device for attachment to the towing structure of a trailer having a pivotal coupling with its towing vehicle, said device comprising
   a casing with a substantially cylindrical side wall adapted to be mounted on the towing structure and adapted to contain a hydraulic fluid, a rotor element rotatably mounted in said casing and having a portion projecting laterally therefrom substantially into engagement with said side wall, a partition element connected to said casing and extending substantially into engagement with said rotor element, a shaft rotatably mounted in said casing and drivingly connected to said rotor element, an operating member drivingly connected to said shaft, a connector secured at one end to said operating member remote from said shaft and adapted to be secured at its opposite end to the towing vehicle in laterally-spaced relationship to the coupling, and means associated with one of said elements for restricting the flow of hydraulic fluid therepast, said laterally-projecting portion comprising a vane,
said flow-restricting means comprising a restricted passageway through said vane.
said rotor element having a radial recess therein,
said vane being mounted for radial sliding motion relatively to said recess,
and resilient means urging said vane radially outward relatively to said rotor element toward said side wall.

References Cited

UNITED STATES PATENTS

| | | | |
|---|---|---|---|
| 1,051,054 | 1/1913 | Anderson | 188—93 X |
| 2,170,898 | 8/1939 | Humphrey | 280—432 |
| 2,612,382 | 9/1952 | Landis | 280—456 |
| 3,273,911 | 9/1966 | Waldie | 280—446 |
| 3,379,456 | 4/1968 | Bogie | 280—443 |
| 3,420,548 | 1/1969 | Wakeman | 280—432 |

FOREIGN PATENTS 484,489  7/1917  France.

LEO FRIAGLIA, Primary Examiner

U.S. Cl. X.R.

188—93; 280—432